(12) United States Patent
Ha et al.

(10) Patent No.: US 11,861,268 B2
(45) Date of Patent: Jan. 2, 2024

(54) APPARATUS AND METHOD FOR AUTO-GENERATING AUTOCAD® DRAWING AND COMPUTER-READABLE RECORDING MEDIUM ON WHICH THE METHOD IS RECORDED

(71) Applicants: SAMSUNG ENGINEERING CO., LTD., Seoul (KR); Tae Woog Kang, Gwangju (KR)

(72) Inventors: Gyun Ho Ha, Seoul (KR); Hyun Suk Lee, Seoul (KR); Young Sik Ji, Seoul (KR); Yun Ha Shin, Seoul (KR); Geun Yong Choi, Seoul (KR); Do Young Park, Seoul (KR); Sung Jin Moon, Seoul (KR); Won Seok Choi, Seoul (KR); Ji Yoon Hyun, Seoul (KR); Byueong Kook Cheo, Gwangju (KR); Dae Seong Kim, Gwangju (KR)

(73) Assignees: SAMSUNG ENGINEERING CO., LTD., Seoul (KR); Tae Woog Kang, Gwangju (KR)

( * ) Notice: Subject to any disclaimer, the term of this patent is extended or adjusted under 35 U.S.C. 154(b) by 120 days.

(21) Appl. No.: 17/344,392

(22) Filed: Jun. 10, 2021

(65) Prior Publication Data
US 2021/0390220 A1   Dec. 16, 2021

(30) Foreign Application Priority Data
Jun. 10, 2020   (KR) .................. 10-2020-0070550

(51) Int. Cl.
*G06F 30/12* (2020.01)
*G06F 3/0482* (2013.01)
*G06F 3/04817* (2022.01)

(52) U.S. Cl.
CPC ............ *G06F 30/12* (2020.01); *G06F 3/0482* (2013.01); *G06F 3/04817* (2013.01)

(58) Field of Classification Search
CPC ...... G06F 30/12; G06F 3/04817; G06F 3/0482
See application file for complete search history.

(56) References Cited

U.S. PATENT DOCUMENTS 6,516,451 B1 * 2/2003 Patin .................. G06F 30/13
716/136
2004/0250236 A1   12/2004 Omalley et al.
(Continued)

FOREIGN PATENT DOCUMENTS

KR       100381863 B1     5/2003
KR      1020090036354    4/2009
(Continued)

OTHER PUBLICATIONS

Korean Office Action issued in corresponding Patent Application No. 10-2020-0070550 dated Nov. 10, 2020.
(Continued)

*Primary Examiner* — Michael Roswell
(74) *Attorney, Agent, or Firm* — Panitch Schwarze Belisario & Nadel LLP

(57) ABSTRACT

A method for auto-generating an AutoCAD drawing includes providing an interface for extracting only input data required for drawing equipment from strength calculation data, displaying all components and nozzles constituting the equipment and providing or correcting information thereon. The AutoCAD drawing is automatically generated based on information on all components constituting the equipment and nozzles.

18 Claims, 17 Drawing Sheets

(56) References Cited

U.S. PATENT DOCUMENTS

| | | | |
|---|---|---|---|
| 2005/0080502 A1* | 4/2005 | Chernyak | G06F 30/00 716/112 |
| 2020/0319630 A1* | 10/2020 | Rudnitsky | G05B 19/41885 |
| 2021/0271783 A1* | 9/2021 | Okada | G06F 30/10 |

FOREIGN PATENT DOCUMENTS

| | | |
|---|---|---|
| KR | 101757451 B1 | 7/2017 |
| KR | 1020130066356 | 11/2017 |
| WO | 9742586 A1 | 11/1997 |

OTHER PUBLICATIONS

Korean Rejection Decision issued in corresponding Patent Application No. 10-2020-0070550 dated Mar. 25, 2021.

* cited by examiner

FIG. 4

| 1) Design Data | |
|---|---|
| CODE | ASME Section VIII Division 1 2017 |
| SPECIFIC GRAVITY | 0.86 |
| LETHAL/TOXIC SERVICE (YES/NO) | No |
| DESIGN INTERNAL PRESSURE | 1640 |
| DESIGN EXTERNAL PRESSURE | 150 |
| DESIGN INTERNAL TEMPERATURE | 231 |
| DESIGN EXTERNAL TEMPERATURE | 231 |
| CORROSION ALLOWANCE | 0 |
| R.T (HEAD) | FULL |
| R.T (SHELL) | FULL |
| JOINT EFFICIENCY (HEAD) | |
| JOINT EFFICIENCY (HEAD) | |
| POST WELD HEAT TREATMENT | None |
| STRESS RELIEVED | |
| HYDRO. TEST PRESSURE(AT SHOP) | 2460 |
| HYDRO. TEST PRESSURE(AT FIELD) | 2460 |
| PNEUMATIC TEST PRESSURE(AT SHOP) | |
| MAWP | 17 |
| MAP | 17 |

330a

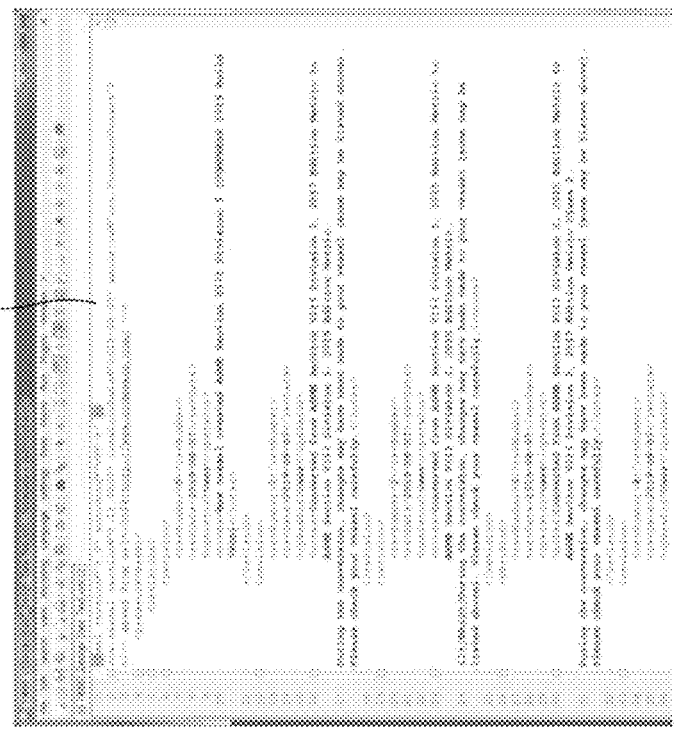

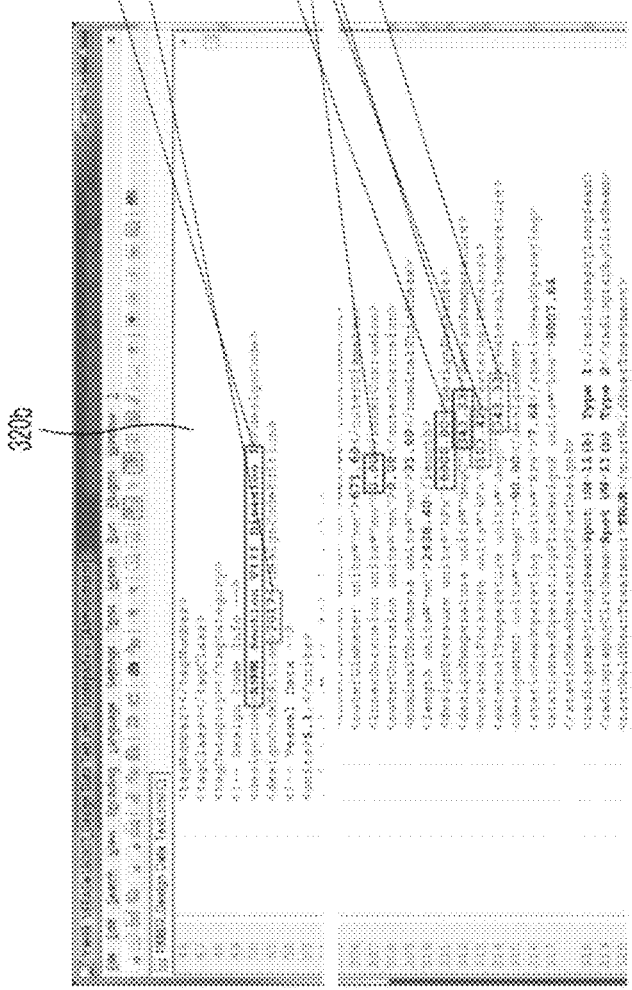

| 1) Design Data | |
|---|---|
| CODE | ASME Section VIII Division 1 [2017] |
| SPECIFIC GRAVITY | 0.86 |
| LETHAL/TOXIC SERVICE (YES/NO) | No |
| DESIGN INTERNAL PRESSURE | 1640 |
| DESIGN EXTERNAL PRESSURE | 150 |
| DESIGN INTERNAL TEMPERATURE | 201 |
| DESIGN EXTERNAL TEMPERATURE | 201 |
| CORROSION ALLOWANCE | 0 |
| R.T. (HEAD) | FULL |
| R.T. (SHELL) | FULL |
| JOINT EFFICIENCY (HEAD) | |
| JOINT EFFICIENCY (HEAD) | |
| POST WELD HEAT TREATMENT | None |
| STRESS RELIEVED | |
| HYDRO. TEST PRESS.(RE/AT SHOP) | 2460 |
| HYDRO. TEST PRESS.(RE/AT FIELD) | 2460 |
| PNEUMATIC TEST PRESS.(RE/AT SHOP) | |
| MAWP | 17 |
| MAP | 17 |
| MDMT | -30.15 |
| PWHT | None |
| INSULATION | N/A |
| FIREPROOFING(IN/OUT) | N/A |
| WIND CODE | ASCE |
| SEISMIC CODE | ASCE |
| IMPACT TEST | No |
| VOLUMN | 7.9 |
| FABRICATION WEIGHT | 6220 |
| ERECTION WEIGHT | |
| EMPTY WEIGHT | 12000 |
| OPERATING WEIGHT | |
| FULL OF WATER WEIGHT | 14280 |

FIG. 9

FIG. 10
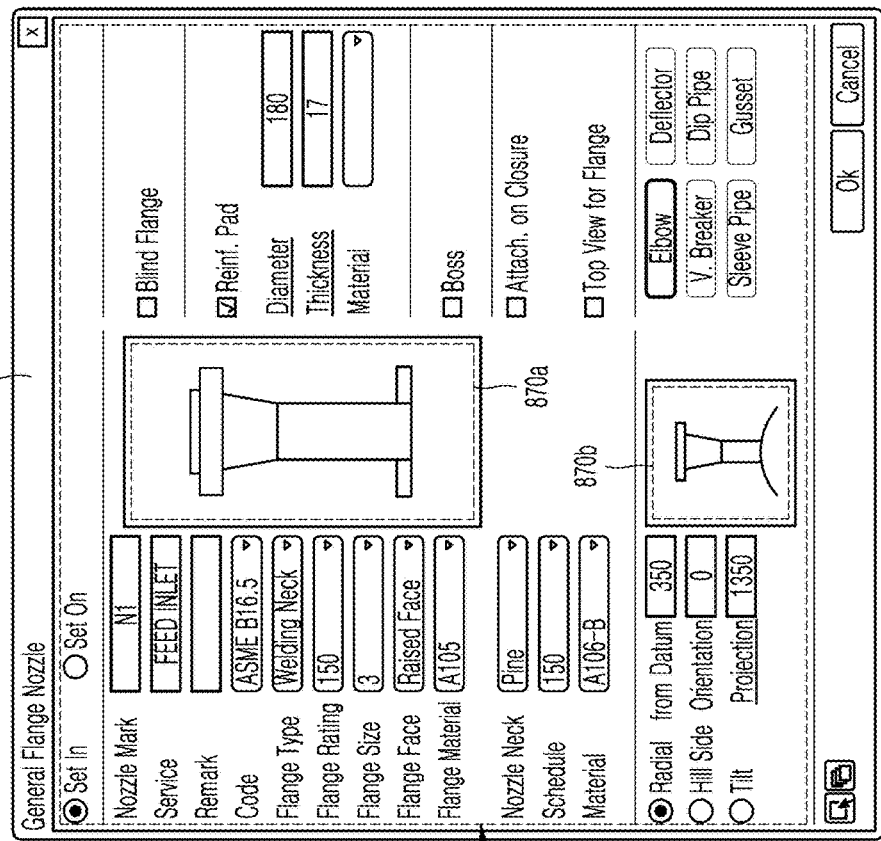
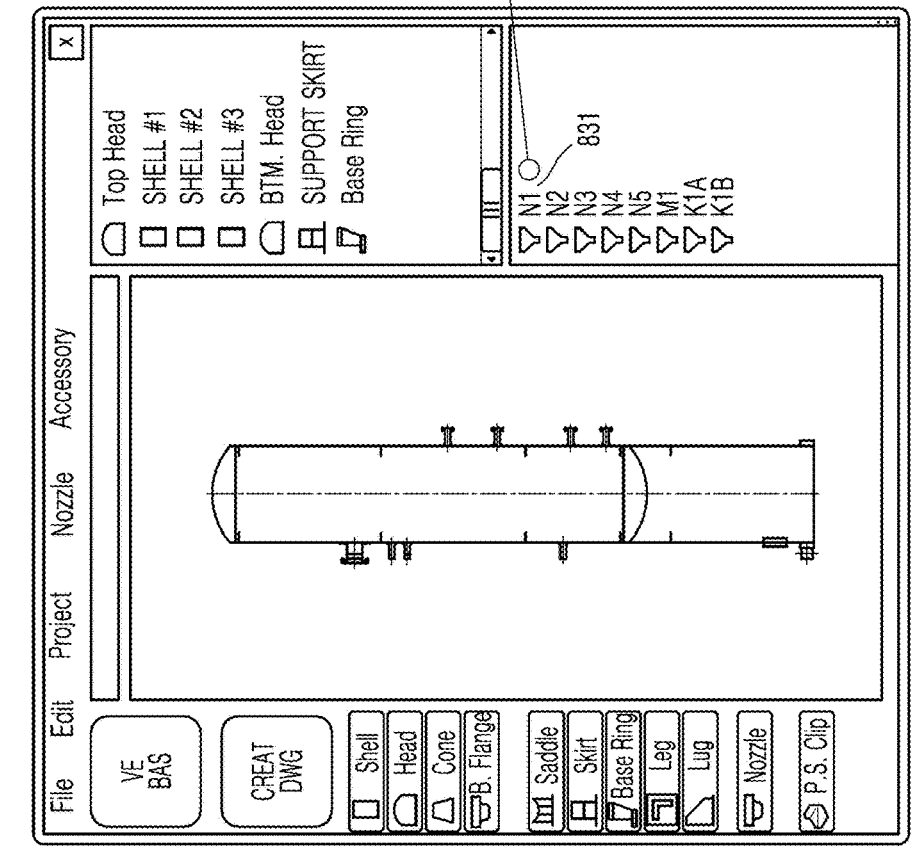

FIG. 12

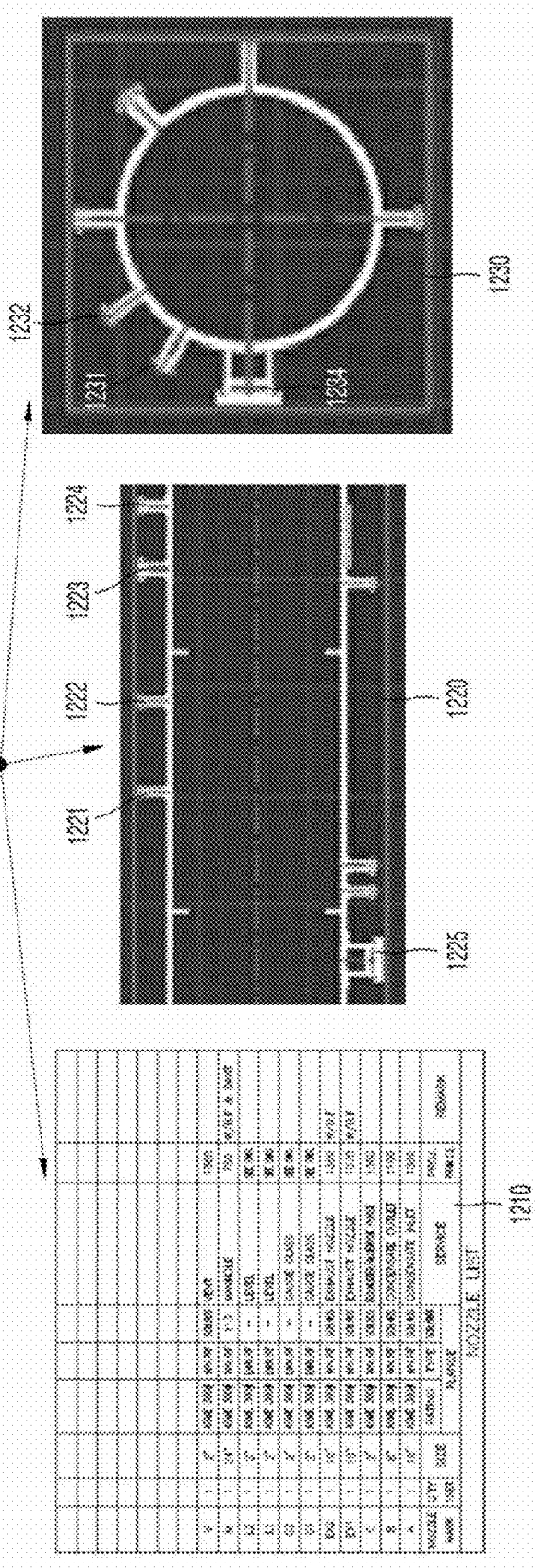

| NOZZLE LIST | | | | | | | | | | | Reinforcing Pad | | | | | | | | |
|---|---|---|---|---|---|---|---|---|---|---|---|---|---|---|---|---|---|---|---|
| NOZZLE MARK | SET IN/ON | SERVICE (Installing Service in Compress and Loading) | Code | TYPE | RATING | SIZE | SCH. | FACE | OD | THK | PROJECTION | BLIND FLANGE | GASKET TYPE | LOCATION FROM DATUM | ORIENTATION (clockwise) | HILL SIDE DISTANCE | FLANGE MATERIAL | NECK MATERIAL |
| N1 | IN | FEED INLET | ASME B16.5 | WN | #150 | 3 | 160 | RF | 180 | 17 | 150 | - | - | 330 | 0 | 0 | A105 | A106-B |
| N2 | IN | FEED OUTLET | ASME B16.5 | WN | #150 | 4 | 160 | RF | 210 | 17 | 150 | - | - | 1080 | 45 | 0 | A105 | A106-B |
| N3 | IN | LIQUID INLET | ASME B16.5 | WN | #150 | 2 | 40 | RF | 150 | 17 | 150 | - | - | 2620 | 90 | 0 | A105 | A106-B |
| N4 | IN | LIQUID OUTLET | ASME B16.5 | WN | #150 | 2 | 40 | RF | 150 | 17 | 150 | - | - | 3660 | 45 | 0 | A105 | A106-B |
| N5 | IN | UTILITY CONN. | ASME B16.5 | WN | #150 | 2 | 160 | RF | 150 | 17 | 150 | - | - | 4520 | 180 | 0 | A105 | A106-B |
| M1 | IN | MANHOLE | ASME B16.5 | WN | #150 | 12 | 80 | RF | 610 | 17 | 140 | YES | SW | 5615 | 270 | 0 | A105 | A106-B |
| K1A | IN | LEVEL TRANSMITTER IN | ASME B16.5 | WN | #150 | 3 | 160 | RF | 180 | 17 | 150 | - | - | 4520 | 300 | 0 | A105 | A106-B |
| K1B | IN | | ASME B16.5 | WN | #150 | 2 | 160 | RF | 150 | 17 | 150 | - | - | 1260 | 325 | 0 | A105 | A106-B |

FIG. 13

| NOZZLE MARK | Q'TY 1SET | SIZE | RATING | TYPE | SCH/THK | SERVICE | PROJ. FROM CL | REMARK |
|---|---|---|---|---|---|---|---|---|
| | | | FLANGE | | | | | |
| A | 1 | 10" | ASME 300# | WN.RF | SCH.40S | CONDENSATE INLET | 1360 | |
| B | 1 | 8" | ASME 300# | WN.RF | SCH.40S | CONDENSATE OUTLET | 1100 | |
| C | 1 | 2" | ASME 300# | WN.RF | SCH.80S | EQUALIZER/ALDEHYDE PURGE | 1360 | |
| EX1 | 1 | 10" | ASME 300# | WN.RF | SCH.40S | EXHAUST NOZZLE | 1070 | W/B.F |
| EX2 | 1 | 10" | ASME 300# | WN.RF | SCH.40S | EXHAUST NOZZLE | 1360 | W/B.F |
| G1 | 1 | 2" | ASME 300# | LWN.RF | — | GAUGE GLASS | SEE DWG. | |
| G2 | 1 | 2" | ASME 300# | LWN.RF | — | GAUGE GLASS | SEE DWG. | |
| L1 | 1 | 2" | ASME 300# | LWN.RF | — | LEVEL | SEE DWG. | |
| L2 | 1 | 2" | ASME 300# | LWN.RF | — | LEVEL | SEE DWG. | |
| M | 1 | 24" | ASME 300# | WN.RF | t13 | MANHOLE | 750 | W/B.F & DAVIT |
| V | 1 | 2" | ASME 300# | WN.RF | SCH.80S | VENT | 1360 | |

NOZZLE LIST

FIG. 14

| CODE | | ASME SEC. VIII DIV.1 2017 EDITION | | |
|---|---|---|---|---|
| CODE STAMP | | YES | NATIONAL BOARD REGISTRATION | YES |
| LOCAL REGULATION | | YES | SERVICE | YES |
| FLUID | | WATER+MEG+ACETALDEHYDE | SUPPORT TYPE | SADDLE |
| DESIGN INTERNAL | PRESS. kg/cm²(g) | 16.4 | CAPACITY M3 | 7.9 |
| | TEMP. °C | 231 | SPECIFIC GRAVITY | 0.86 |
| DESIGN EXTERNAL | PRESS. kg/cm²(g) | F.V | RADIOGRAPHY (SHELL/HEAD) | FULL / FULL |
| | TEMP. °C | 231 | JOINT EFFICIENCY | 1.0 / 1.0 |
| OPERATING | PRESS. kg/cm²(g) | 14.6 | P.W.H.T. | NO |
| | TEMP. °C | 201 | STRESS RELIEF | NO |
| M.A.W.P (NEW & COLD) kg/cm²(g) | | 17 | IMPACT TEST | NO |
| M.A.W.P (HOT & CORRODED) kg/cm²(g) | | 17 | INSULATION mm | 90 (HOT) |
| M.D.M.T. °C | | -12 | FIRE PROOFING (IN/OUT) mm | NO |
| TEST PRESSURE Kg/cm²(g) | HYDRO.(SHOP) | 24.6 | WIND CODE | ASCE-7 16, V=60 km/hr, EXPOSURE SITE-S |
| | HYDRO.(FIELD) | 24.6 | SEISMIC CODE | ASCE-7 16, R=3, SITE CLASS-S, Sds=0.69, SDs=0.62 |
| | PNEUM. | - | WEIGHT Kg | FABRICATION | 4570 |
| CORROSION ALLOWANCE mm | SHELL | 0 | | ERECTION | 4570 |
| | HEAD | 0 | | EMPTY | 6220 |
| | SUPPORT | 0 | | OPERATING | 12000 |
| | | | | FULL WATER | 14230 |
| DESIGN DATA | | | | |

FIG. 16

| FOUNDATION LOADING DATA ||||||
|---|---|---|---|---|
| PART || EMPTY | OPERATING | HYDROTEST |
| WIND | SHEAR (Kgf) | 996 | 996 | 498 |
| | MOMENT (kgf-m) | 1233 | 1233 | 616 |
| SEISMIC | SHEAR (Kgf) | 41 | 82 | – |
| | MOMENT (kgf-m) | 51 | 102 | – |

| NO. | DWG NO. | DESCRIPTIONS |
|---|---|---|
| 9 | SC6122-MFA120-01-J1GA0001-009 | DETAIL OF NAME PLATE |
| 8 | SC6122-MFA120-01-J1GA0001-008 | DETAIL OF INTERNAL SUP'T |
| 7 | SC6122-MFA120-01-J1GA0001-007 | DETAIL OF INSULATION SUP'T CLIP |
| 6 | SC6122-MFA120-01-J1GA0001-006 | DETAIL OF TEMPLATE |
| 5 | SC6122-MFA120-01-J1GA0001-005 | DETAIL OF NOZZLE (2/2) |
| 4 | SC6122-MFA120-01-J1GA0001-004 | DETAIL OF NOZZLE (1/2) |
| 3 | SC6122-MFA120-01-J1GA0001-003 | DETAIL OF MANHOLE |
| 2 | SC6122-MFA120-01-J1GA0001-002 | DETAIL OF BODY |
| 1 | SC6122-MFA120-01-J1GA0001-001 | GENERAL ASSEMBLY |

DETAIL DRAWINGS

APPARATUS AND METHOD FOR AUTO-GENERATING AUTOCAD® DRAWING AND COMPUTER-READABLE RECORDING MEDIUM ON WHICH THE METHOD IS RECORDED

CROSS-REFERENCE TO RELATED APPLICATION

This application is based on and claims priority under 35 U.S.C. § 119 to Korean Patent Application No. 10-2020-0070550, filed on Jun. 10, 2020, in the Korean Intellectual Property Office, the disclosure of which is incorporated by reference herein in its entirety.

BACKGROUND

1. Field

One or more embodiments relate to a method for auto-generating an AutoCAD® (computer-aided design) drawing by using strength calculation data.

2. Description of the Related Art

In the related art, after a user checks strength calculation result data calculated by a strength calculation program, the user has manually input the strength calculation result data by using a drawing tool provided by an AutoCAD® program so as to produce a drawing.

PRIOR ART DOCUMENTS

Patent Documents

KR 10-1757451 B1
KR 10-2009-0036354 B1
KR 10-2013-0066356 B1

SUMMARY

One or more embodiments include a method for auto-generating an AutoCAD® drawing by using strength calculation data, whereby an AutoCAD® drawing may be automatically generated by using all elements that constitute a component to be generated by using strength calculation result data.

Additional aspects will be set forth in part in the description which follows and, in part, will be apparent from the description, or may be learned by practice of the presented embodiments of the disclosure.

According to one or more embodiments, an apparatus for auto-generating an AutoCAD® drawing includes a receiver configured to receive only input data required for drawing equipment from strength calculation data about the equipment provided by a strength calculation program, a loading unit configured to load the input data, a display unit configured to display a shape of the equipment and information on each of components constituting the equipment by using the loaded input data, wherein the display unit includes a shape display unit configured to display the shape of the equipment, a component icon bar configured to display a component list in which all of components constituting the equipment are each displayed as an icon, and a nozzle icon bar configured to display a nozzle list in which all of nozzles constituting the equipment are each displayed as an icon.

The display unit may further include an information providing unit configured to load an identifier, type, diameter, size, thickness or material of a component or nozzle corresponding to a selected component icon or nozzle icon from the input data so as to provide the input data through a separate window when an arbitrary component icon in the component icon bar or an arbitrary nozzle icon in the nozzle icon bar is selected.

The apparatus may further include a preprocessor configured to extract only input data required for drawing all of components constituting the equipment from the strength calculation data about the equipment having a first format from the strength calculation program to convert the extracted input data into a second format, wherein the input data includes a nozzle list, design data, material specification, and detail drawing data.

The preprocessor may include a data extracting unit configured to extract at least one piece of data corresponding to a preset item on each of the components at a preset position of the strength calculation data having the first format so as to draw each of all components constituting the equipment, a mapping table generating unit configured to generate a mapping table for providing general information including unit information corresponding to a preset item so as to draw of each of all components constituting the equipment, and an input data generating unit configured to generate input data converted into the second format based on at least one piece of data extracted at the preset position or data in the mapping table.

The apparatus may further include an AutoCAD® drawing automatic creation interface configured to automatically generate an AutoCAD® drawing by using the input data when the AutoCAD® drawing automatic creation interface is activated.

The information providing unit may further provide a shape image corresponding to a selected component icon or nozzle icon when an arbitrary component icon in the component icon bar or an arbitrary nozzle icon in the nozzle icon bar is selected.

The information providing unit may further provide an interface configured to correct information provided through a separate window by loading information such as an identifier, type, diameter, size, thickness, and material of a component or nozzle corresponding to the selected component icon or nozzle icon from the input data.

According to one or more embodiments, a method for auto-generating an AutoCAD® drawing includes obtaining strength calculation data about equipment having a first format from a strength calculation program, extracting only input data required for drawing all of components constituting the equipment from the strength calculation data to convert the extracted input data into a second format, loading the input data having the second format, displaying a shape of the equipment and information about each of components constituting the equipment based on the loaded input data by using a display unit, and, when an AutoCAD® drawing automatic creation interface provided by the display unit is activated, automatically generating an AutoCAD® drawing by using the input data.

According to one or more embodiments, a method for auto-generating an AutoCAD® drawing includes selecting only input data required for drawing from strength calculation data about equipment to be generated having a first format XML and converting the selected input data into a second format XLS, performing conversion based on at least one data value at a preset position of the first format or a data value in a mapping table generated based on the data of the first format, loading the data having the second format in an image viewer, displaying the data having the second format on the image viewer, and automatically generating an AutoCAD® drawing by using the data having the second format in the image viewer.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 4 through 6 illustrate an example in which strength calculation data is converted into input data, according to an embodiment;

FIGS. 9 and 10 illustrate an example of an information providing unit for providing information on each of components of a component icon bar or a nozzle icon bar of an apparatus for auto-generating an AutoCAD® drawing according to an embodiment;

FIG. 12 illustrates an example of the relationship between input data and an AutoCAD® drawing, according to an embodiment;

FIGS. 13 through 16 illustrate an example of data disclosed in an AutoCAD® drawing, according to an embodiment.

DETAILED DESCRIPTION

Figure 1:
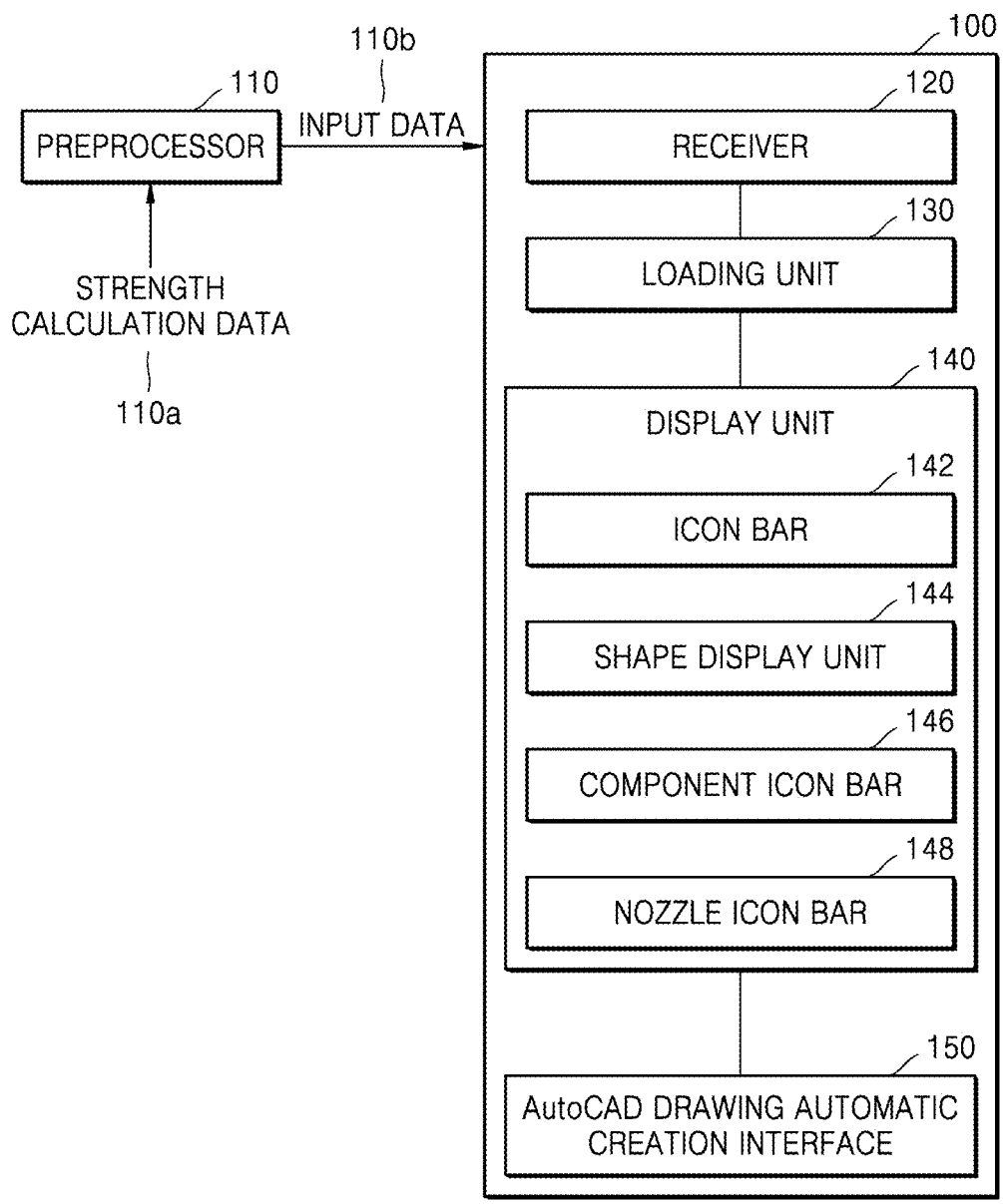
FIG. 1 illustrates the internal configuration of an apparatus for auto-generating an AutoCAD® drawing according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, it will be described in detail with reference to the drawings so that those of ordinary skill in the art to which the present disclosure belongs can easily understand and reproduce.

FIG. 1 illustrates the internal configuration of an apparatus for auto-generating an AutoCAD® drawing according to an embodiment.

An apparatus 100 for auto-generating an AutoCAD® drawing and a preprocessor 110 may use different terminals or may be integrated to use a single terminal. Terminals may include computers, laptop computers, smartphones, tablets, handheld devices, and wearable devices. Terminals may refer to devices that may run applications or programs, including a processor and a display.

The apparatus 100 for auto-generating an AutoCAD® drawing may include a receiver 120, a loading unit 130, a display unit 140, and an AutoCAD® drawing automatic creation interface 150.

The apparatus 100 for auto-generating an AutoCAD® drawing may receive input data 110b from the preprocessor 110. The preprocessor 110 may extract only the input data 110b from strength calculation data 110a on equipment provided by a strength calculation program. In the present disclosure, the input data 110b may refer to data required for drawing all components that constitute the equipment.

In the apparatus 100 for auto-generating an AutoCAD® drawing, the loading unit 130 may load the input data received by the receiver 120, and the loaded input data may be displayed on the display unit 140 and then, the AutoCAD® drawing automatic creation interface 150 may be activated to automatically generate the AutoCAD® drawing about the equipment.

Figure 2:
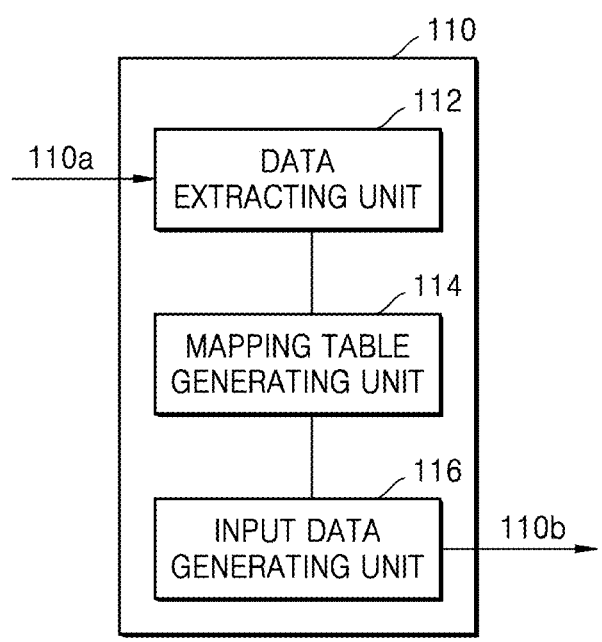
FIG. 2 illustrates the internal configuration of a preprocessor according to an embodiment.

Referring to FIG. 2, the preprocessor 110 may extract only the input data 110b from the strength calculation data 110a received from the strength calculation program. To this end, the preprocessor 110 may include a data extracting unit 112, a mapping table generating unit 114, and an input data generating unit 116.

Hereinafter, each component of the preprocessor 110 will be described with reference to FIGS. 3 through 6 and then, the receiver 120, the loading unit 130, the display unit 140, and the AutoCAD® drawing automatic creation interface 150 will be described with reference to FIGS. 7 through 16.

Figure 3:
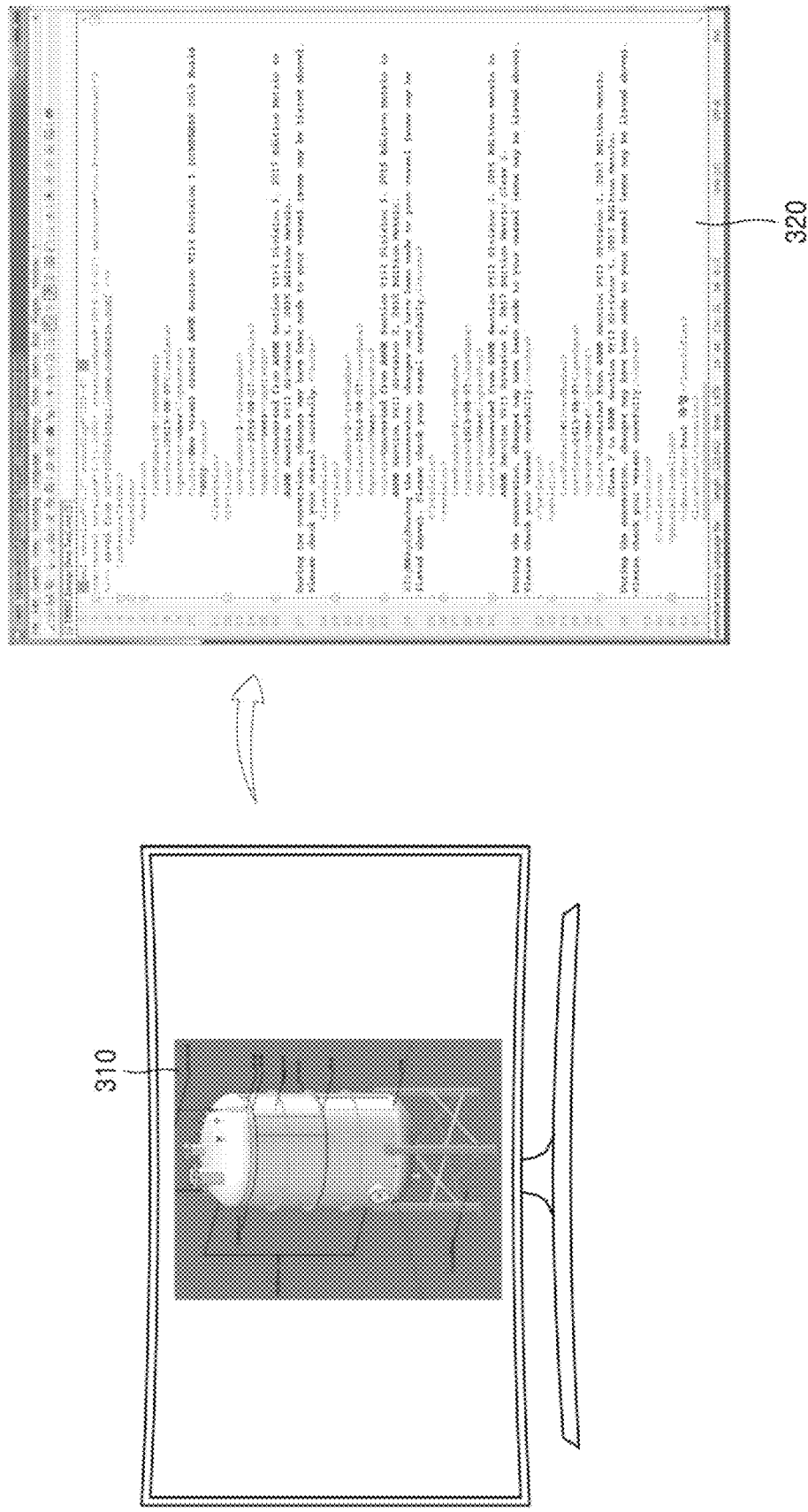
FIG. 3 illustrates an example of strength calculation data provided by a strength calculation program according to an embodiment.

The data extracting unit 112 may receive strength calculation data (see 320 of FIG. 3) on certain equipment provided by the strength calculation program (see 310 of FIG. 3). An example of the strength calculation program 310 may include a compress program. The strength calculation data 320 may have an XML format, but this is only an example, and various modifications may be made.

The data extracting unit 112 may extract input data in the format shown in an embodiment of FIGS. 4 and 5 from strength calculation data 320, 320a, and 320b received. In this case, input data 330a and 330b may be a data sheet having an XLS format, but one or more embodiments are not limited thereto, and various modifications may be made.

The input data 330a and 330b may be a data sheet including at least one of general information (see 330c of FIG. 6), design data 330a and 330b, a material list, a nozzle list, a nozzle load, foundation loading data, head data, shell data, cone data, girth flange data, stiffener ring data, skirt data, baseblock data, support lug data, support leg data, and saddle data.

The general information (see 330c of FIG. 6) may include vessel position information, support base elevation information, C. O. G information, and information such as a pressure unit, a temperature unit, a length unit, a weight unit, and a velocity unit. An example of the design data 330a and 340a may be one by referring to FIGS. 3 and 4.

The material list may include information about a shell, a head, a skirt, a support lug, a support leg, a saddle, a nozzle neck, a nozzle flange, a nozzle blind, and nozzle fitting.

Referring back to FIG. 2, the data extracting unit 112 may extract a data value at a preset position of the strength calculation data 320a to extract input data 330a having an XLS format, as shown in an example of FIG. 4. The data extracting unit 112 may extract data values at a plurality of preset positions of the strength calculation data 320b, combine the extracted data values and extract the input data 330b having an XLS format.

Figure 6:
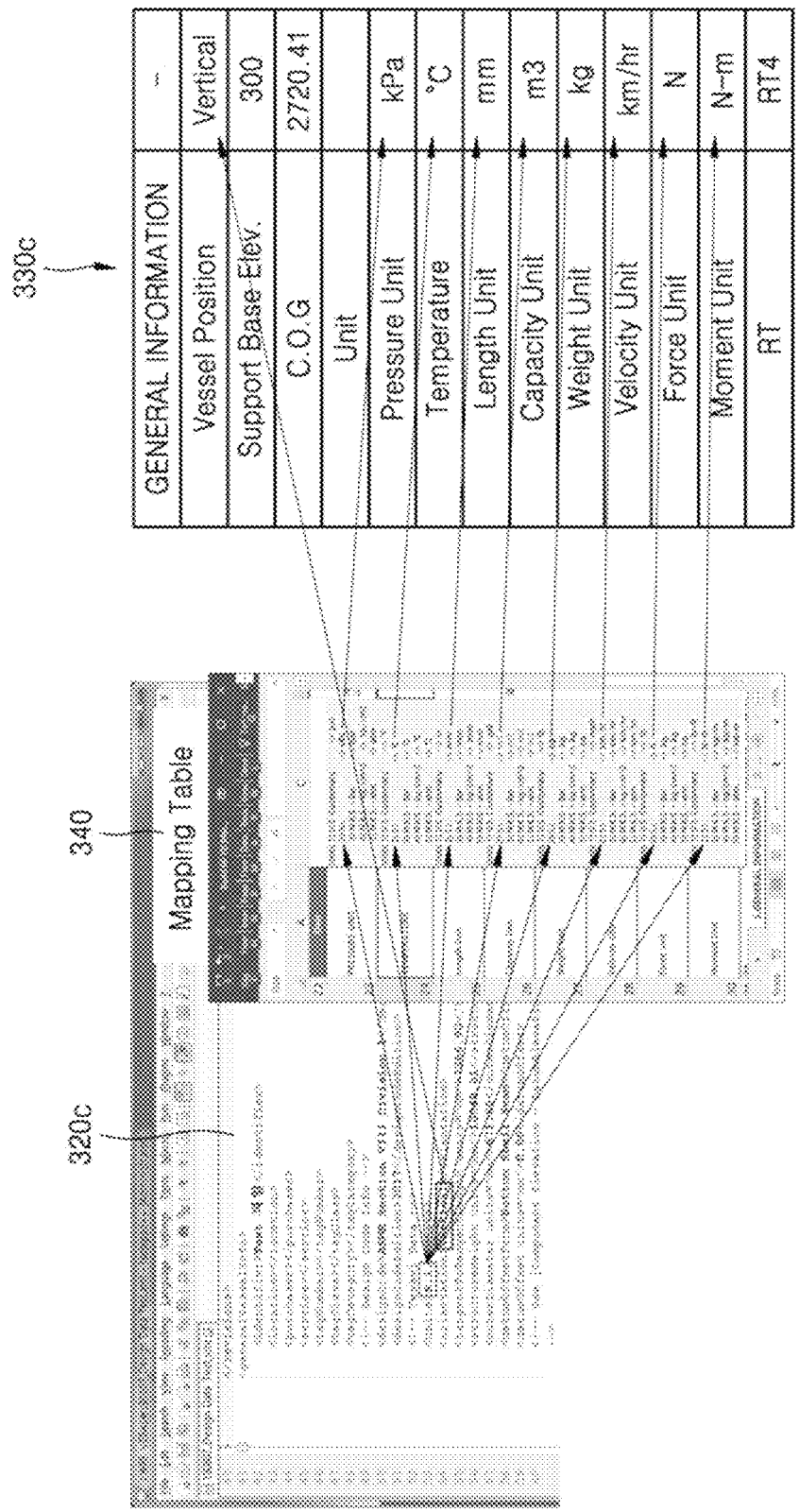

Referring to FIG. 6, the mapping table generating unit 114 may generate a mapping table 340 so as to provide the general information (see 330c of FIG. 6) including unit information corresponding to a preset item for drawing each of all components that constitute equipment.

The input data generating unit 116 may generate input data by using the input data 330a and 330b extracted by the data extracting unit 112 in the manner as in FIGS. 4 and 5 and the mapping table 340 of FIG. 6.

Figure 7:
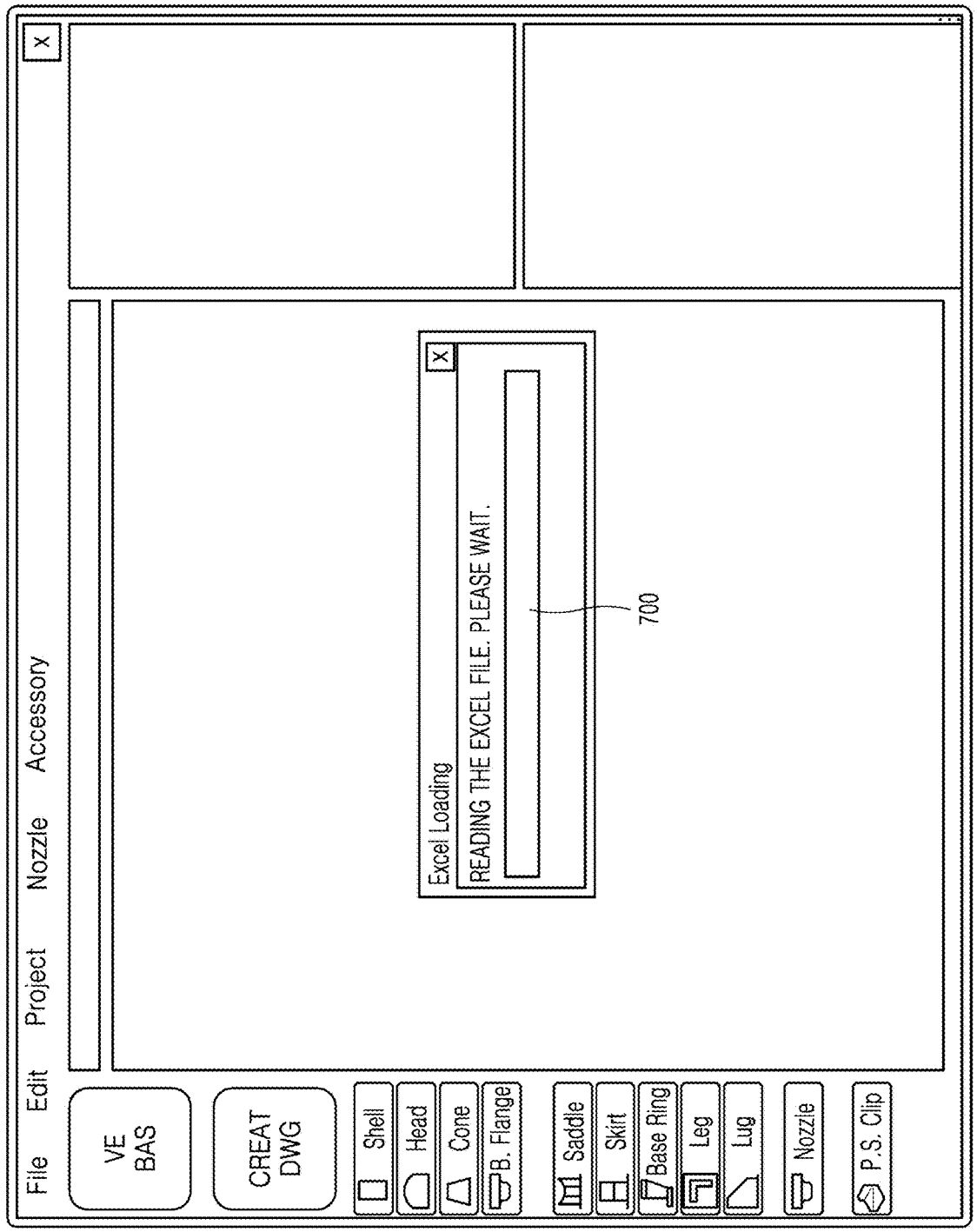
FIG. 7 illustrates an example in which input data is loaded by an apparatus for auto-generating an AutoCAD® drawing according to an embodiment.

Referring back to FIG. 1, the receiver 120 may receive the input data 110b from the preprocessor 110, and the loading unit 130 may load the input data 110b into the apparatus 100 for auto-generating an AutoCAD® drawing. FIG. 7 illustrates an example in which loading is performed by a loading unit 700.

Figure 8:
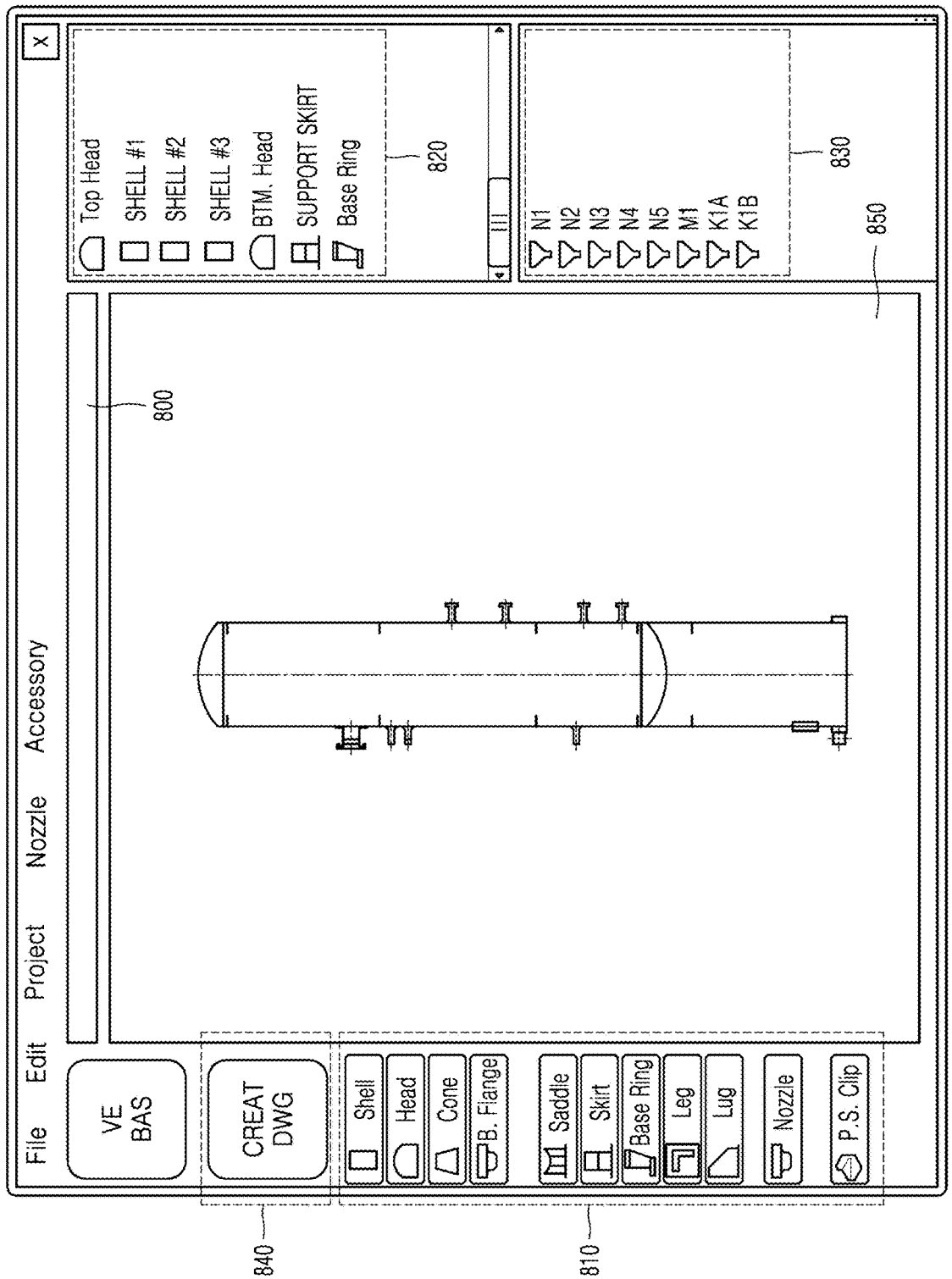
FIG. 8 illustrates an example of an apparatus for auto-generating an AutoCAD® drawing into which input data is loaded, according to an embodiment.

Referring to FIG. 7, before loading of the input data 110b is completed, the apparatus 100 for auto-generating an AutoCAD® drawing has no information on components constituting the equipment for which the AutoCAD® drawing is to be generated, and may provide only an icon bar (see 810 of FIG. 8) and an AutoCAD® drawing automatic creation interface (see 840 of FIG. 8). The AutoCAD® drawing automatic creation interface may be activated only after loading is completed.

When loading of the input data 110b is completed, the shape of the equipment and information about each component constituting the equipment may be displayed on the display unit 140.

Referring to FIG. 8, when loading of the input data 110b is completed, a display unit 800 may include a shape display unit 850 for displaying the shape of the equipment, a component icon bar 820 for displaying a list of components of the equipment, in which all components are each displayed as an icon, and a nozzle icon bar 830 for displaying a list of nozzles of the equipment, in which all the nozzles are each displayed as an icon.

According to an embodiment, the list of components and the list of nozzles respectively displayed on the component icon bar 820 and the nozzle icon bar 830 may be linked with the input data 110b, and information provided by information providing units 850a and 850b on components and nozzles included in each of the list of components and the list of nozzles may be also linked with the input data 110b and automatically generated.

Referring to FIG. 12, input data 330d may be linked with data 1210 described in AutoCAD® drawings 1220 and 1230. For example, when the input data 330d is a nozzle list the input data 330d may be linked with the Auto CAD drawing 1220 (a side view) in which the data 1210 about a nozzle list displayed on the AutoCAD® drawing 1220 and the AutoCAD® drawing 1230 (a cross-sectional view) in which nozzles 1221 to 1225 and 1231 to 1234 displayed on the nozzle list are displayed.

A list of all components constituting the equipment shown in the shape display unit 850 may be displayed on the component icon bar 820. The user may check the component icon bar 820 and may check whether there is a list of components that are omitted or included in error.

A list of nozzles constituting the equipment shown in the shape display unit 850 may be displayed on the nozzle icon bar 830, and the user may check the nozzle icon bar 830 and check whether there is a list of nozzles that are omitted or included in error.

The display unit 140 may further include information providing units 850a and 850b that load an identifier, type, diameter, size, thickness or material of a component or nozzle corresponding to the selected component icon or nozzle icon or material information from the input data so as to provide the input data through a separate window when an arbitrary component icon in the component icon bar 820 or an arbitrary nozzle icon in the nozzle icon bar 830 is selected.

Figure 9:
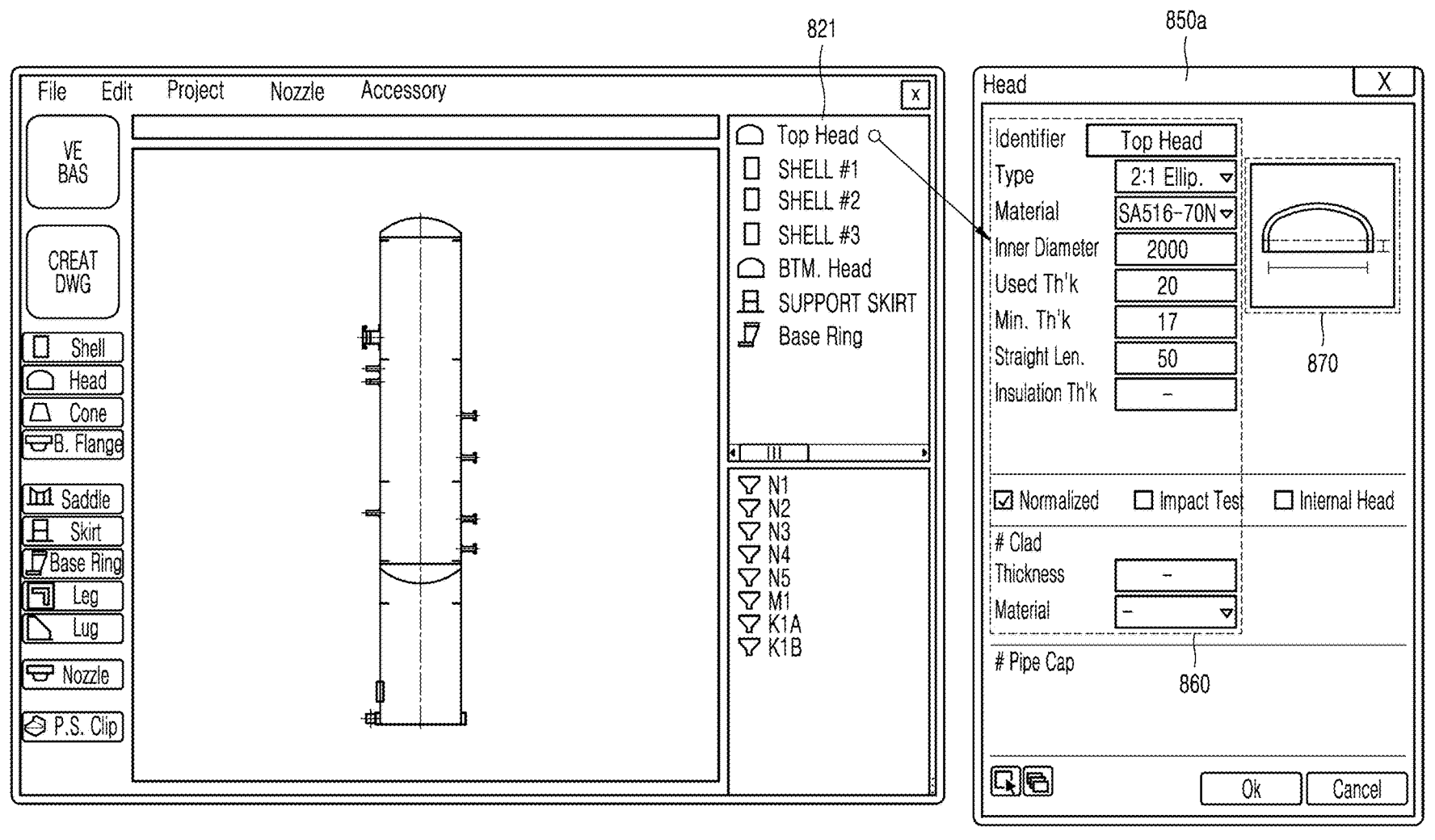

FIG. 9 illustrates an example in which, when an icon "Top Head" 821 in the component icon bar 820 is selected and activated, the information providing unit 850a provides information including information 860 such as an identifier, type, material, inner radius, used thickness, minimum thickness, and length of the icon "Top Head" 821 and shape information 870 of the icon "Top Head" 821. In an embodiment, when there is an error in each item provided by the information providing unit 850a, the user may manually correct and store the error.

FIG. 10 illustrates an example in which, when a nozzle "N1" 831 in the nozzle icon bar 830 is selected and activated, the information providing unit 850b provides information such as a mark, service usage, code, Flange Type, Flange Rating, Flange Size, Flange Face, Flange Material, nozzle neck, Schedule, Material information, information such as radius, thickness, and the like and information including first shape information 870a and second shape information 870b. In an embodiment, when there is an error in each item provided by the information providing unit 850b, the user may manually correct and store the error.

Figure 11:
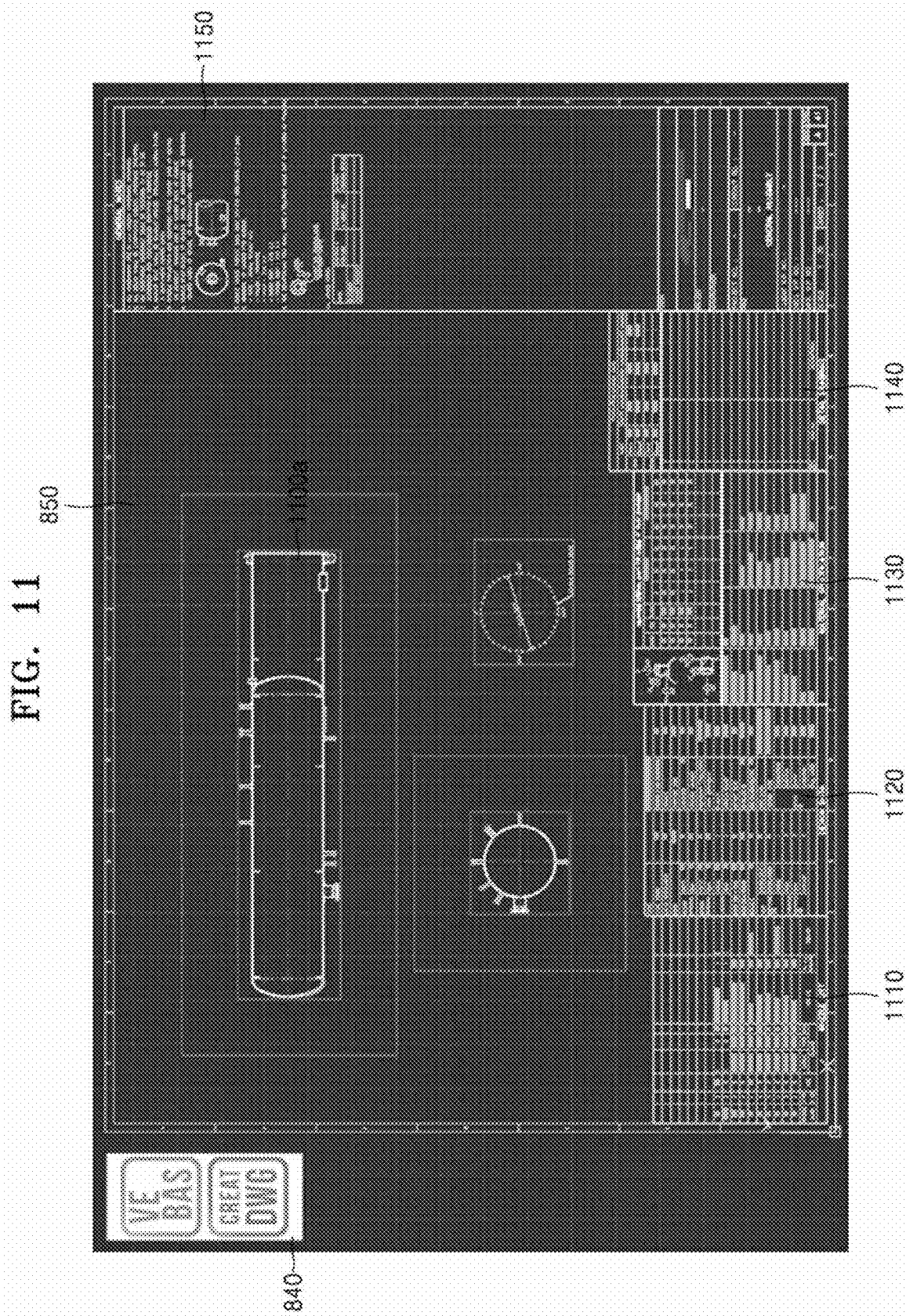
FIG. 11 illustrates an example in which an AutoCAD® drawing is generated by an apparatus for auto-generating an AutoCAD® drawing, according to an embodiment.

FIG. 11 illustrates an example in which, when the AutoCAD® drawing automatic creation interface 840 is activated, an AutoCAD® drawing on the equipment shown in the shape display unit 850 is generated.

The AutoCAD® drawing automatic creation interface 840 may be activated at any time after loading of the input data is completed. The user may check whether there is an error or omission in information regarding components constituting the equipment displayed on the shape display unit (see 850 of FIG. 8) or nozzle information after the procedures of FIGS. 7 through 10 are performed, the AutoCAD® drawing automatic creation interface 840 may be activated so that the AutoCAD® drawing on the equipment shown in the shape display unit 850 is generated, which is shown in FIG. 11, may be generated. The AutoCAD® drawing on the equipment shown in the shape display unit 850 is generated, may have an AutoCAD® format.

Also, the AutoCAD® drawing on the equipment shown in the shape display unit 850 is generated, which is generated, may simultaneously display a nozzle list 1110 that constitutes the equipment generated by using at least one of a front view, a side view, a rear view and a cross-sectional view of the equipment and input data, design data 1120 preset for each of components constituting the equipment, a material specification 1130, and detail drawing information 1140. Also, the AutoCAD® drawing on the equipment shown in the shape display unit 850 is generated, which is generated, may further include general note 1150 information.

Figure 15:
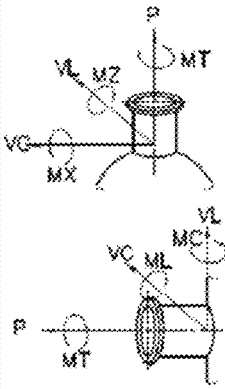

FIG. 13 illustrates an example of the nozzle list 1110 displayed on the AutoCAD® drawing, FIG. 14 illustrates an example of the design data 1120 displayed on the Auto-CAD® drawing, FIG. 15 illustrates an example of the material specification 1130 displayed on the AutoCAD® drawing, and FIG. 16 illustrates an example of the detail drawing information 1140 displayed on the AutoCAD® drawing.

Figure 17:
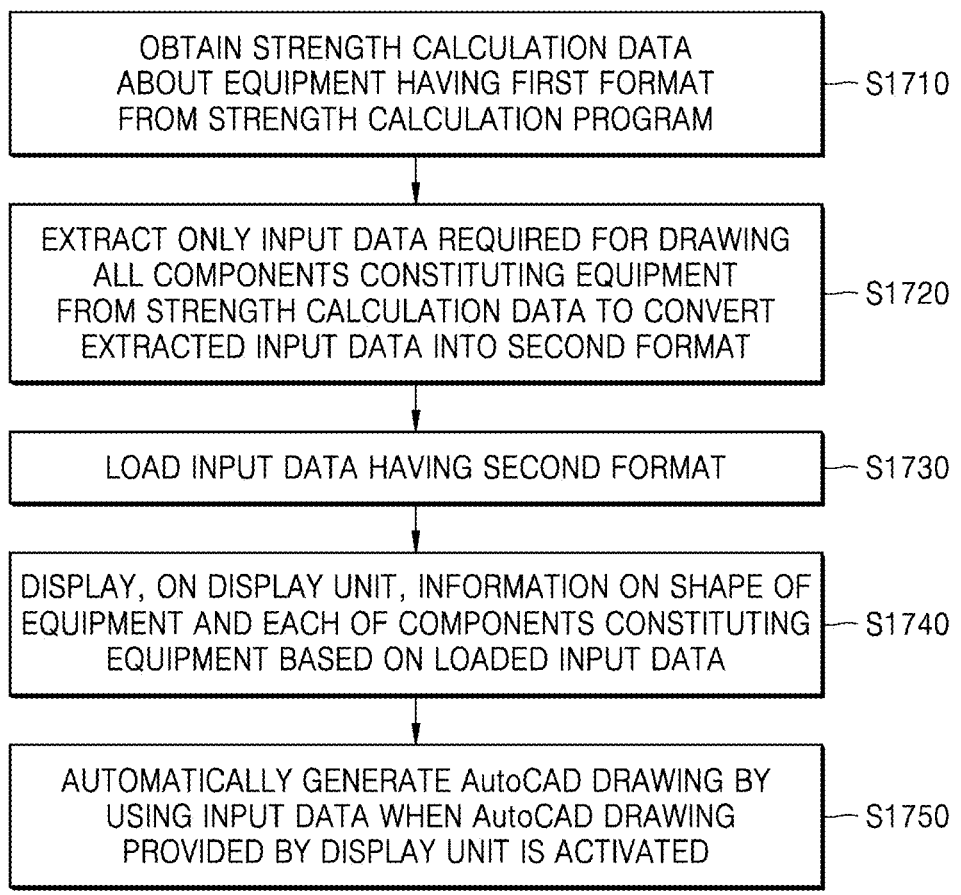
FIG. 17 is a flowchart illustrating a method for auto-generating an AutoCAD® drawing according to an embodiment.

FIG. 17 is a flowchart illustrating a method for auto-generating an AutoCAD® drawing according to an embodiment.

A preprocessor may obtain strength calculation data about equipment having a first format from a strength calculation program (S1710) and may extract only input data required for drawing all of components constituting the equipment from the strength calculation data to convert the extracted input data into a second format (S1720).

After the loading unit loads input data having the second format (S1730), the display unit may display the shape of the equipment and information about each of components constituting the equipment based on the loaded input data (S1740). Subsequently, when the AutoCAD® drawing automatic creation interface is activated, the AutoCAD® drawing may be automatically generated by using the input data (S1570).

Methods according to an embodiment of the present disclosure may be implemented in the form of program instructions that can be executed through various computer units and recorded in a computer-readable recording medium. The computer-readable recording medium may include program instructions, data files, data structures, and the like singly or in combination. The program instructions stored in the computer-readable recording medium may be specially designed and configured for the present invention, or may be known and usable to those skilled in the art of computer software.

In the method and apparatus for auto-generating an Auto-CAD® drawing according to one or more embodiments, a problem that a user directly checks strength calculation data using a document or electronic file and manually creates drawings by directly inputting the confirmed strength calculation data using a drawing tool provided by an Auto-CAD® program, may be solved, and a problem that an error occurs due to omitted data in a process of manually creating a drawing, may be solved.

In addition, a problem that the user extracts and inputs data required for drawings one by one so that a design period is delayed, may be reduced so that the total manufacturing time may be reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for auto-generating a computer-aided design drawing, the apparatus comprising:
   a receiver configured to receive only input data required for drawing equipment from strength calculation data about the equipment provided by a strength calculation program;
   a loading unit configured to load the input data;
   a display unit configured to display a shape of the equipment and information on each of components constituting the equipment by using the loaded input data, wherein
   the display unit comprises:
      a shape display unit configured to display the shape of the equipment;
      a component icon bar configured to display a component list in which all of components constituting the equipment are each displayed as an icon; and
      a nozzle icon bar configured to display a nozzle list in which all of nozzles constituting the equipment are each displayed as an icon,
   wherein the input data is made by extracting data values at a plurality of preset positions of the strength calculation data having a first format, combining the extracted data values and converting the extracted data values into a second format, and
   wherein the component list and the nozzle list respectively displayed on the component icon bar and the nozzle icon bar are linked with the input data.

2. The apparatus of claim 1, wherein the display unit further comprises an information providing unit configured to load an identifier, type, diameter, size, thickness or material of a component or nozzle corresponding to a selected component icon or nozzle icon or material information from the input data so as to provide the input data through a separate window when an arbitrary component icon in the component icon bar or an arbitrary nozzle icon in the nozzle icon bar is selected.

3. The apparatus of claim 2, wherein the information providing unit further provides a shape image corresponding to a selected component icon or nozzle icon when an arbitrary component icon in the component icon bar or an arbitrary nozzle icon in the nozzle icon bar is selected.

4. The apparatus of claim 2, wherein the information providing unit further comprises an interface configured to correct information provided through a separate window by loading information such as an identifier, type, diameter, size, thickness, and material of a component or nozzle corresponding to the selected component icon or nozzle icon from the input data.

5. The apparatus of claim 1, further comprising:
   a preprocessor configured to extract only input data required for drawing all of components constituting the equipment from the strength calculation data about the equipment having a first format from the strength calculation program to convert the extracted input data into a second format, wherein
   the input data comprises a nozzle list, design data, material specification, and detail drawing data.

6. The apparatus of claim 5, wherein the preprocessor comprises:
   a data extracting unit configured to extract at least one piece of data corresponding to a preset item on each of the components at a preset position of the strength calculation data having the first format so as to draw each of all components constituting the equipment;
   a mapping table generating unit configured to generate a mapping table for providing general information including unit information corresponding to a preset item so as to draw of each of all components constituting the equipment; and an input data generating unit configured to generate input data converted into the second format based on at least one piece of data extracted at the preset position or data in the mapping table.

7. The apparatus of claim 1, further comprising a computer-aided design drawing automatic creation interface configured to automatically generate the computer-aided design drawing by using the input data when the computer-aided design drawing automatic creation interface is activated.

8. A method for auto-generating a computer-aided design drawing, the method comprising:
    obtaining strength calculation data about equipment having a first format from a strength calculation program;
    extracting only input data required for drawing all of components constituting the equipment from a plurality of preset positions of the strength calculation data having a first format, combining the extracted input data, and converting the combined input data into a second format;
    loading the input data having the second format;
    displaying, on a display unit, a shape of the equipment and information about each of components constituting the equipment based on the loaded input data; and,
    when a computer-aided design drawing automatic creation interface provided by the display unit is activated, automatically generating the computer-aided design drawing by using the input data,
    wherein the display unit comprises:
        a shape display unit configured to display a shape of the equipment,
        a component icon bar configured to display a component list in which all of components constituting the equipment are each displayed as an icon, and
        a nozzle icon bar configured to display a nozzle list in which all of nozzles constituting the equipment are each displayed as an icon, and
    wherein the component list and the nozzle list respectively displayed on the component icon bar and the nozzle icon bar are linked with the input data.

9. The method of claim 8, wherein the displaying of the information further comprises checking and correcting detail information on each of the components.

10. A computer-readable recording medium comprising a program, which when executed by a computer, performs the method for auto-generating the computer-aided design drawing of claim 9.

11. The method of claim 8, wherein the display unit further comprises an information providing unit configured to load an identifier, type, diameter, size, thickness or material of a component or nozzle corresponding to a selected component icon or nozzle icon or material information from the input data so as to provide the input data through a separate window when an arbitrary component icon in the component icon bar or an arbitrary nozzle icon in the nozzle icon bar is selected.

12. A computer-readable recording medium comprising a program, which when executed by a computer, performs the method for auto-generating the computer-aided design drawing of claim 11.

13. The method of claim 8, wherein the converting of the extracted input data into the second format comprises:
    extracting at least one data value described at a preset position of strength calculation data having a first format or extracting at least one data value from a mapping table for providing general information including unit information on a preset item so as to draw each of all components constituting the equipment; and
    generating input data based on the at least one data value having the first format at the preset position or the data value in the mapping table generated based on the strength calculation data having the first format and converting the input data into the second format.

14. A computer-readable recording medium comprising a program, which when executed by a computer, performs the method for auto-generating the computer-aided design drawing of claim 13.

15. The method of claim 8, wherein
    the display unit displays the generated computer-aided design drawing when the computer-aided design drawing automatic creation interface is activated, and
    the computer-aided design drawing simultaneously displays a nozzle list that constitutes the equipment generated by using at least one of a front view, a side view, a rear view and a cross-sectional view of the equipment and input data, design data preset for each of components constituting the equipment, a material specification, and detail drawing information.

16. A computer-readable recording medium comprising a program, which when executed by a computer, performs the method for auto-generating the computer-aided design drawing of claim 15.

17. A computer-readable recording medium comprising a program, which when executed by a computer, performs the method for auto-generating the computer-aided design drawing of claim 8.

18. A computer-readable recording medium comprising a program, which when executed by a computer, performs the method for auto-generating the computer-aided design drawing of claim 8.

* * * * *